United States Patent
Wang et al.

(10) Patent No.: US 12,550,040 B2
(45) Date of Patent: Feb. 10, 2026

(54) METHOD OF COMMUNICATION, DEVICE, CHIP AND COMPUTER READABLE STORAGE MEDIUM

(71) Applicants: Beijing ESWIN Computing Technology Co., Ltd., Beijing (CN); Guangzhou Transa Semi Information Technology Co., Ltd., Guangzhou (CN)

(72) Inventors: Zhen Wang, Beijing (CN); Yanzhong Dai, Beijing (CN); Xiao Li, Beijing (CN)

(73) Assignees: Beijing ESQIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 504 days.

(21) Appl. No.: 18/091,588

(22) Filed: Dec. 30, 2022

(65) Prior Publication Data

US 2023/0284117 A1  Sep. 7, 2023

(30) Foreign Application Priority Data

Mar. 2, 2022  (CN) .......................... 202210199544.X (51) Int. Cl.
*H04W 40/24* (2009.01)
*H04W 84/12* (2009.01)
(52) U.S. Cl.
CPC .......... *H04W 40/246* (2013.01); *H04W 84/12* (2013.01)

(58) Field of Classification Search
None
See application file for complete search history.

(56) References Cited

U.S. PATENT DOCUMENTS

| 8,340,007 B2 | 12/2012 | Lu et al. |
| 2010/0029205 A1 | 2/2010 | Lu et al. |
| 2013/0315099 A1* | 11/2013 | Chen ..................... H04W 40/24 370/254 |

(Continued)

FOREIGN PATENT DOCUMENTS

| CN | 101640581 A | 2/2010 |
| CN | 104320412 A | 1/2015 |

(Continued)

OTHER PUBLICATIONS

First Office Action, including Search Report, for Chinese Patent Application No. 202210199544.X, dated Oct. 11, 2022, 14 pages.

*Primary Examiner* — Brian S Roberts
(74) *Attorney, Agent, or Firm* — Westman, Champlin & Koehler, P.A.

(57) ABSTRACT

The application relates to a method of communication, a device, a chip and a computer readable storage medium. The present disclosure provides a method of communication and related devices, the method of communication including: acquiring address information in a first frame by a first device, wherein the first frame comprises a data field, and the data field carries the address information; determining whether the first frame is from a matched device of the first device according to the address information by the first device. The present disclosure improves signal receiving performance.

15 Claims, 6 Drawing Sheets

(56) References Cited

U.S. PATENT DOCUMENTS

| | | | | |
|---|---|---|---|---|
| 2015/0124678 A1* | 5/2015 | Asterjadhi | ........ | H04W 52/0235 |
| | | | | 370/311 |
| 2015/0181505 A1* | 6/2015 | Deng | .................... | H04W 48/10 |
| | | | | 713/160 |
| 2015/0382283 A1* | 12/2015 | Wang | ................ | H04W 52/0216 |
| | | | | 370/328 |

FOREIGN PATENT DOCUMENTS

| | | |
|---|---|---|
| CN | 104469980 A | 3/2015 |
| CN | 104717762 A | 6/2015 |
| CN | 108880869 A | 11/2018 |
| CN | 111107667 A | 5/2020 |
| CN | 113596805 A | 11/2021 |
| CN | 114222254 A | 3/2022 |

* cited by examiner

METHOD OF COMMUNICATION, DEVICE, CHIP AND COMPUTER READABLE STORAGE MEDIUM

CROSS-REFERENCE TO RELATED APPLICATION

This application claims priority to the Chinese Patent Application No. 202210199544.X, filed on Mar. 2, 2022, entitled "method of communication, device, chip and computer readable storage medium", and published as CN114567918A on May 31, 2022, which is incorporated herein by reference in its entirety in this disclosure.

BACKGROUND OF THE DISCLOSURE

Field of Technology

The present disclosure relates to a field of wireless communication technologies, and in particular, to a method of communication, a device, a chip, and a computer readable storage medium.

Description of the Related Art

A wireless local area network (WLAN) is a network system using radio frequency technology to transmit data over air. With widespread application of intelligent terminals, a demand of data network traffic is increasing, and carrying of the traffic through WLAN has become one of very important information data transmission modes.

In a WLAN system, a device needs to correctly receive a signal from a matched device to ensure communication quality, but at present, signal receiving performance is poor, and how to improve the signal receiving performance is a problem to be considered.

SUMMARY

In view of the above problems, the present disclosure provides a method of communication, device, chip and computer readable storage medium, so as to improve signal receiving performance of a wireless local area network (WLAN) system.

In a first aspect, there is provided a method of communication, comprising:
  acquiring address information in a first frame by a first device, wherein the first frame comprises a data field, and the data field carries the address information;
  determining whether the first frame is from a matched device of the first device according to the address information by the first device.

Optionally, the address information comprises a destination address and/or a source address.

Optionally, the method further comprises:
if the first frame is from the matched device of the first device, determining to receive the data field by the first device, otherwise, abandoning to receive the data field by the first device.

Optionally, the method further comprises:
if the first frame is from a matched device of the first device, determining to stop energy search by the first device, otherwise, keeping the energy search by the first device; wherein the energy search is used to acquire a signal from a second device other than the first device.

Optionally, the first device is configured to receive the data field while the energy search is stopped and resume the energy search when the data field is completely received.

Optionally, an operation that the first device receives the data field in a condition that the first frame is from the matched device of the first device, comprises:
  generating a matching instruction in the condition that the first frame is from the matched device of the first device, so as to stop the energy search before a receiving process of the first frame is stopped based on the matching instruction.

Optionally, the method further comprises: generating a non-matching instruction in a condition that the first frame is not from the matched device of the first device, so as to stop the receiving process of the first frame and keep the energy search based on the non-matching instruction.

Optionally, the matching instruction and the non-matching instruction are respectively corresponding to different level states of a same control instruction.

Optionally, determining whether the first frame is from a matched device of the first device according to the address information by the first device, comprises:
  if the address information in the data field matches address information stored in the first device, determining that the first frame is from the matched device of the first device, otherwise, determining that the first frame is not from the matched device of the first device.

Optionally, the first frame further comprises a signaling field;
  the method further comprises: determining that the first frame meets a preset signal format according to the signaling field by the first device.

Optionally, the method further comprises: searching, by the first device, for the first frame at a target time through the energy search, wherein the first frame is a signal with a largest signal intensity among at least one signal searched by the first device at the target time.

In a second aspect, there is provided a device for communication, comprising: a processor and a memory, the memory is configured to store a set of programs, instructions or codes, the processor is configured to execute the programs, instructions or the codes stored in the memory to operate steps of any one of the above methods.

In a third aspect, there is provided a chip, comprising a processor and a memory, the memory is configured to store a set of programs, instructions or codes, the processor is configured to execute the programs, instructions or the codes stored in the memory to operate steps of any one of the above methods.

In a forth aspect, there is provided a computer readable storage medium, wherein the computer readable storage medium stores computer programs or instructions configured to be executed by a processor, so as to implement any one of the above methods.

Beneficial effects of the present disclosure:
  according to the method of communication provided by the present disclosure, the first device determines whether the first frame is from the matched device of the first device according to the address information in the data field, and a determination result is accurate and reliable, which is beneficial to improving an accuracy of receiving signals, thus improving signal receiving performance.

DETAILED DESCRIPTION OF THE DISCLOSURE

To facilitate an understanding of the present disclosure, the present disclosure will now be described more fully with reference to accompanying drawings. Preferred embodiments of the present disclosure are set forth in the accompanying drawings. This disclosure may, however, be embodied in different forms and should not be construed as limited to the embodiments set forth herein. Rather, these embodiments are provided so that this disclosure will be thorough and complete.

In a wireless local area network, a wireless access point (AP) and a station (Sta) are two indispensable main bodies, wherein the wireless access point is a creator of a wireless network and is configured to provide wireless network services to outside, and a wireless router used in a home or an office is the wireless access point; the station is a terminal connected to the wireless network for receiving the wireless network services, such as a notebook computer, a personal digital assistant (PDA), a mobile phone and other user device which is capable of being networked.

Figure 1:
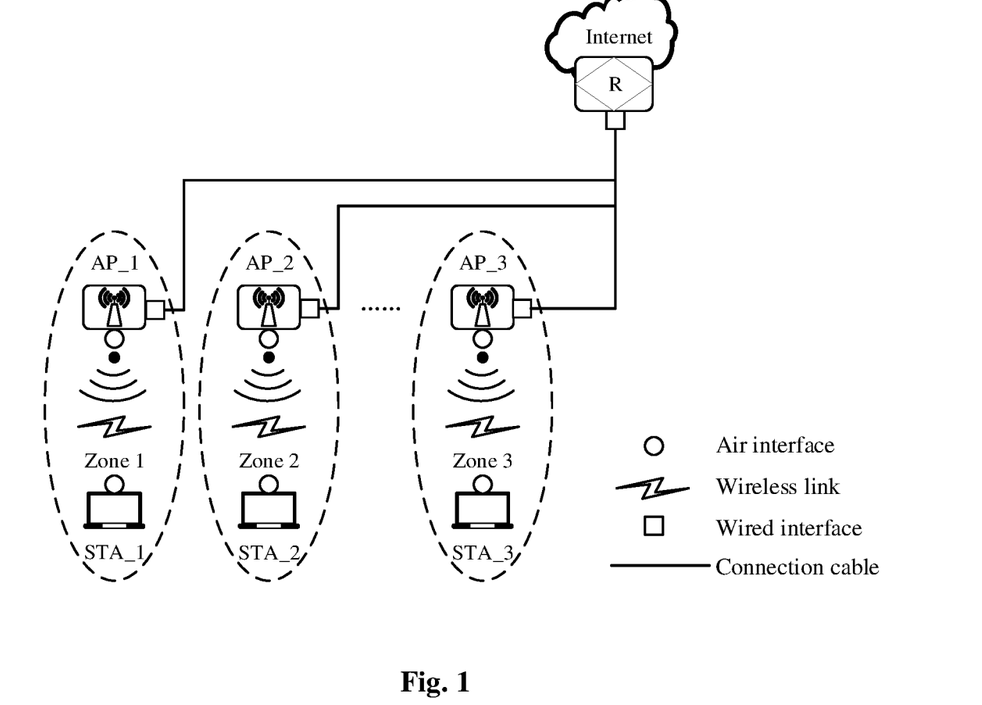
FIG. 1 is a schematic operation diagram of a wireless local area network.

FIG. 1 is a schematic operation diagram of a wireless local area network. Referring to FIG. 1, the wireless access points and stations in the wireless local area network (e.g., zone 1, zone 2, or zone 3, which are enclosed by dashed lines) communicate through wireless link transmission frames, which include uplink frame and downlink frame. The wireless link is established between air interfaces which are virtual logic interfaces on the wireless access point and the station, and the air interfaces are invisible and untouchable. Wi-Fi (Wireless Fidelity) signals are wirelessly transmitted between air interfaces, and the uplink frame and the downlink frame are both Wi-Fi signals. Corresponding to the air interface is a wired interface (the wired interface is usually referred to as an optical interface and an electrical interface), which is constant on the wireless access point and connects the wireless access point to internet through a connection cable.

With densification and diversification of electronic devices, wireless signals existing in a finite space are more and more in variety, and there are other various signals besides the Wi-Fi signals, which includes but not limited to electromagnetic waves emitted by an electromagnetic oven, microwaves emitted by a microwave oven, and signals emitted by a Bluetooth device, so that the air interface on which the Wi-Fi signal transmission is based faces signals sent by a plurality of non-matching devices, an air interface environment is more and more complex, and thus receiving the Wi-Fi signals faces more and more interference. A first step of receiving Wi-Fi signal is capturing signal, how to capture signals sent by matched device under various interferences in the complex air interface environment directly determines receiving performance of the Wi-Fi signals, which is one of key technologies to be broken through by a Wi-Fi receiver.

Figure 2:
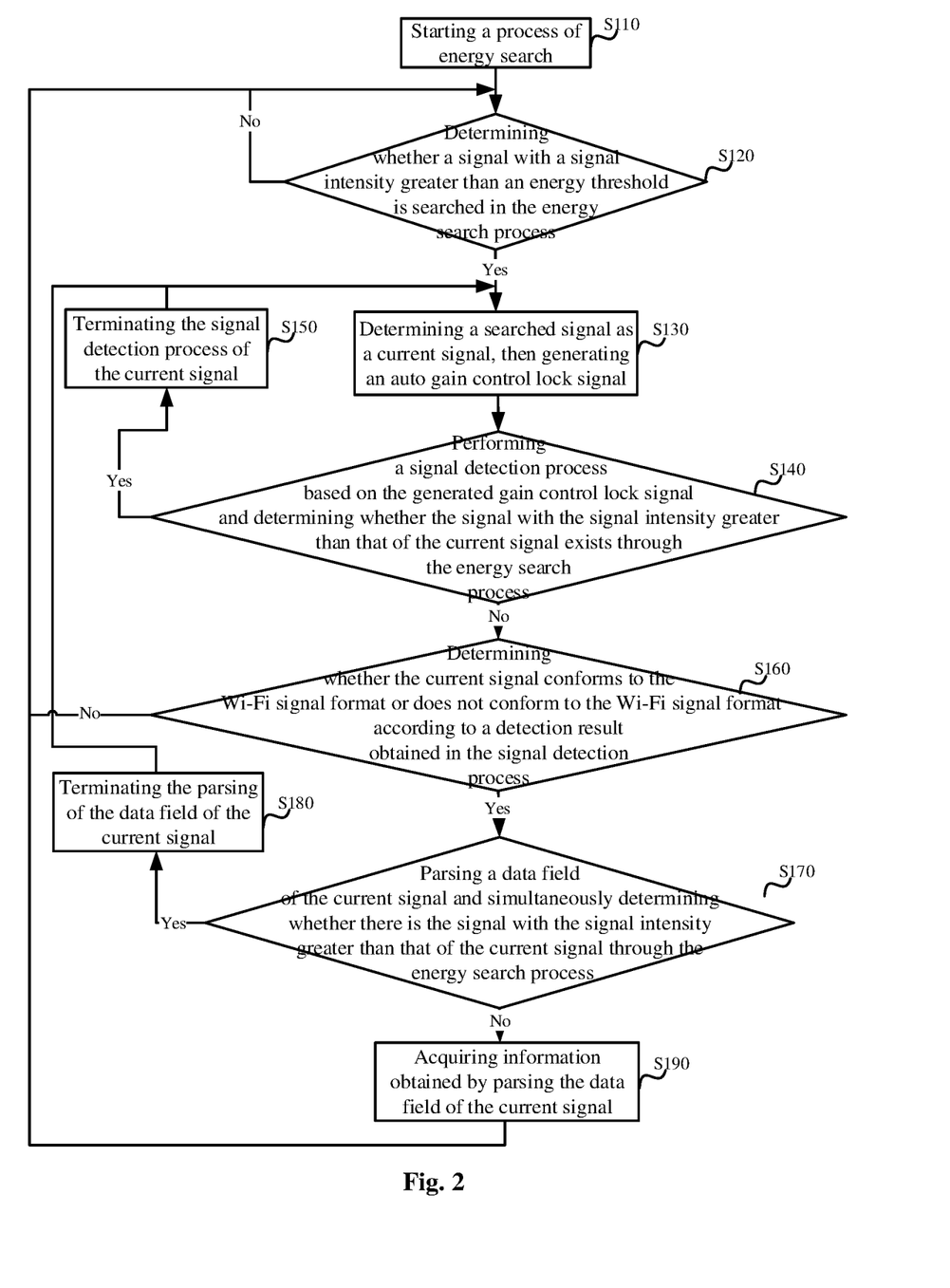
FIG. 2 is a flow chart of a method for capturing wireless fidelity (Wi-Fi) signals according to a conventional Wi-Fi receiver.

At present, in order to enhance an anti-interference capability of the Wi-Fi receiver in the complex air interface environment and improve an accuracy of capturing the Wi-Fi signal by the Wi-Fi receiver, the Wi-Fi receiver captures the Wi-Fi signal by using the capturing method shown in FIG. 2. It should be understood that the capturing method shown in FIG. 2 is only an exemplary method for capturing Wi-Fi signals adopted by current Wi-Fi receivers, and does not cover all technical solutions for capturing Wi-Fi signals by current Wi-Fi receivers.

It should be noted that the wireless access point in a same local area network matches to a plurality of matched stations. For example, only one router is provided in an office for a plurality of employees to access the internet through laptops or mobile phones, so that the wireless access point matches to the plurality of matched stations. However, due to a limitation of a contention mechanism, the wireless access point may only receive the Wi-Fi signal transmitted by one matched station at the same time. It can be seen that the plurality of matched stations does not interfere with the wireless access point capturing the Wi-Fi signal. An interference of the wireless access point capturing the Wi-Fi signal is from signals sent by an unmatched device, and comprises a non-Wi-Fi signal sent by the unmatched device and the Wi-Fi signals sent by the unmatched device.

For a station, only one wireless access point is connected at the same time, that is, only the connected wireless access point is matched at the same time. An interference of the station capturing the Wi-Fi signal is also from signals sent by a variety of unmatched devices.

The Wi-Fi receiver is a machine for receiving the Wi-Fi signals, and may be a signal receiving device included in the wireless access point, or may be a signal receiving device included in the station. No matter which end the Wi-Fi receiver belongs to, the Wi-Fi receiver may only receive one signal at the same time, that is, the Wi-Fi receiver cannot receive other signals any more after being occupied by a receiving process of a signal, so that the accuracy of the Wi-Fi receiver capturing the Wi-Fi signal is improved, the Wi-Fi receiver is required not to be occupied by the receiving process of the Wi-Fi signals sent by unmatched device as far as possible, and meanwhile, the Wi-Fi receiver is required to accurately capture the Wi-Fi signals sent by the matched device from a plurality of signals in an idle time.

Referring to FIG. 2, an exemplary method for capturing Wi-Fi signals presently performed by a Wi-Fi receiver includes:

Step S110, starting a process of energy search. Specifically, the process is a process of searching for a signal within a band or a full bandwidth range performed according to signal intensity.

In practice, Wi-Fi receivers produced by various manufacturers generally adopt a similar method, and most of the method is to search a full bandwidth energy to ensure that an analog to digital converter (ADC) in the Wi-Fi receiver does not overflow, and then capturing the signal through searching for an in-band energy. The full bandwidth here refers to a bandwidth corresponding to a sampling rate of the analog-to-digital converter.

Step S120, determining whether a signal with a signal intensity greater than an energy threshold is searched in the energy search process, if so, performing step S130, otherwise, continuing to perform step S120.

Specifically, the signal threshold may be set to a minimum intensity of the Wi-Fi signal in an effective communication distance, which may be obtained by pre-testing a matched device of the Wi-Fi receiver. This step is performed by filtering out a plurality of non-Wi-Fi signals or invalid Wi-Fi signals in the air interface environment through the signal threshold.

Step S130, determining a searched signal as a current signal, then generating an auto gain control lock (AGC Lock) signal.

The auto gain control lock signal is a status signal that serves as an indicator for indicating that a signal (i.e., the current signal) is locked, and then step S140 is performed. It should be understood that since some non-Wi-Fi signals also have greater signal intensity, the current signal may be either the Wi-Fi signal or the non-Wi-Fi signal.

Step S140, performing a signal detection process based on the generated gain control lock signal and determining whether there is a signal with the signal intensity greater than that of the current signal existing through the energy search process, and if yes, performing step S130 after step S150 is performed, otherwise, performing step S160.

The signal detection process is used for determining whether the current signal conforms to a Wi-Fi signal format, and specifically, detection may be performed through a signaling field of a frame carried by the current signal. It should be understood that if the current signal conforms to the Wi-Fi signal format, the current signal is the Wi-Fi signal, otherwise, the current signal is not a Wi-Fi signal.

Step S150, terminating the signal detection process of the current signal.

It should be understood that this step is to terminate the signal detection process of the current signal, and by then performing step S130, the receiving process of the current signal can be terminated, and the receiving process of the signal with the signal intensity greater than that of the current signal is then performed, regardless of whether the current signal is a signal sent by the matched device to the Wi-Fi receiver.

Step S160, determining whether the current signal conforms to the Wi-Fi signal format or does not conform to the Wi-Fi signal format according to a detection result obtained in the signal detection process, if so, performing step S170, otherwise, performing step S120.

This step is performed in a condition that a signal having a larger signal intensity has not been searched in the signal detection process, that is, in a condition that the signal detection process is not interrupted, so that it is possible to obtain the detection result and determine whether to subsequently perform step S170 or step S120 based on the detection result.

Step S170, parsing a data field of the current signal and simultaneously determining whether there is the signal with the signal intensity greater than that of the current signal through the energy search process, and if so, performing step S180 and then performing step S130, otherwise, performing step S190 and then performing step S120.

Step S180, terminating the parsing of the data field of the current signal.

It should be understood that this step is to terminate the parsing of the current signal, and by then performing step S130, the receiving process of the current signal may be terminated, and the receiving process of the signal with the signal intensity greater than that of the current signal is then performed, regardless of whether the current signal is a signal that the matched device sends to the Wi-Fi receiver.

Step S190, acquiring information obtained by parsing the data field of the current signal.

This step completes the receiving process of the current signal, and the subsequent step S120 is to perform the receiving process of a next signal.

It should be noted that, after starting the energy search process in step S110, the energy search process is not interrupted during the execution of steps S120 to S190, so that the energy search process is continuously performed, and in practice, the energy search process is interrupted by turning off the Wi-Fi receiver.

Since the Wi-Fi receiver and the matched device generally have a short distance in space, a consuming of energy caused by the distance of the Wi-Fi signal sent by the matched device is less, and the Wi-Fi signal sent by the matched device has strong energy, the capturing method shown in FIG. 2 may leak the Wi-Fi signal sent by the matched device without detection to a large extent. However, in some special conditions, the Wi-Fi signal sent by the matched device may be less than an energy intensity of other Wi-Fi signals (for example, a user holding a mobile phone in an office building may be closer to an unmatched router than a matched router at a certain time), so that the Wi-Fi signal sent by the matched device is interrupted by other Wi-Fi signals after step S140 or step S170, and a false alarm probability increases.

Figure 3:
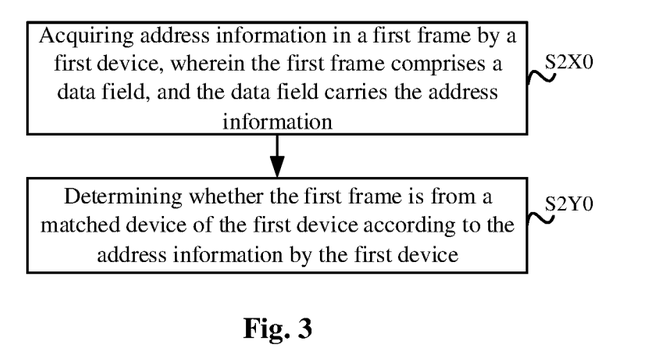
FIG. 3 is a flow chart of a method of communication provided according to an embodiment of the present disclosure.

In view of this, the disclosed embodiments provide a method of communication. FIG. 3 is a flow chart of a method of communication provided according to an embodiment of the present disclosure. Referring to FIG. 3, the method of communication provided in the embodiment of the present disclosure includes:

Step S2X0, acquiring address information in a first frame by a first device, wherein the first frame comprises a data field, and the data field carries the address information.

Step S2Y0, determining whether the first frame is from a matched device of the first device according to the address information by the first device.

It should be noted that the first device may be the wireless access point in the wireless local area network, the station in the wireless local area network, or a device or a chip in the wireless access point or the station, for example, the first device is the Wi-Fi receiver in the wireless access point or the station.

Figure 4:
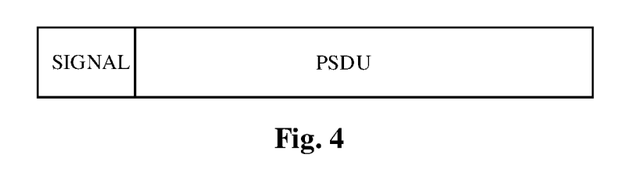
FIG. 4 is a schematic diagram of one kind of structure generally included in a frame.
Figure 5:
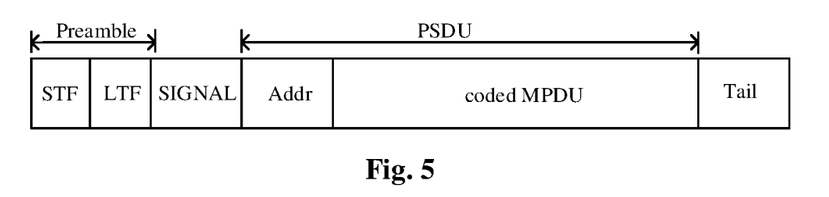
FIG. 5 is a schematic diagram of an exemplary detailed frame structure.

For the wireless local area network, the first frame is a frame transmitted for communication. Under provisions of different protocols, frames have different formats, such as Ethernet frame format, 802.3 frame format, MAC frame format, etc., and each of the frames in these formats includes two parts, namely a signaling field (SIGNAL) and a data field (Presentation Service Data Unit, PSDU) as shown in FIG. 4, where a first preset byte of the data field is the address information. FIG. 5 is a schematic diagram of an exemplary detailed frame structure, and referring to FIG. 5, a preamble may be further disposed before the signaling field, wherein the preamble includes a short training field (STF) and a long training field (LTF); the data field (PSDU) further includes a protocol tail (Tail), the address information and the protocol tail respectively served as a head and a tail of the data field defines a position of an encrypted data information (coded Message Protocol Data Unit, coded MPDU).

In one frame, the address information is unencrypted information and includes a destination address and a source address, wherein the destination address is an address of a receiver of the frame, and the source address is an address of a sender of the frame. In the wireless local area network, the addresses of both the receiver and the sender of the Wi-Fi signal are their own medium access control (MAC) addresses. A data link layer generally relies on the MAC address of the device for data exchange. The MAC addresses are generally built into each network card and require global uniqueness just like a public IP addresses to ensure that each device with the network card inserted is uniquely identified in the wireless local area network. Taking the first device served as the station in the wireless local area network as an example, the source address is the MAC address of the wireless access point sending the frame, and the MAC address of the wireless access point is a basic service set identifier (BSSID) in a professional field; the destination address is the MAC address of the station receiving the frame, and the MAC address of the wireless access point is the destination address (DA) in the professional field.

It should be noted that the address information of the frame may include the destination address and the source address, but in some cases, the destination address included in the address information of the frame is invalid, for example, the destination address in the broadcast frame is information in a special format, indicating an invalid empty address, and for example, the broadcast frame is a frame in which an access point (AP) broadcasts various configuration parameters of the access point (AP); in other cases, the source address included in the address information of the frame is invalid, such as a response frame. The address information obtained by the first device in step S2X0 needs to be valid, and thus the address information obtained by the first device in step S2X0 includes only a valid destination address in some examples and only a valid source address in other examples, although it is also possible to include both the valid destination address and the valid source address in other examples.

In the wireless local area network, the step S2Y0 may also be understood as determining whether to receive the data field or capture the data field according to the address information in the data field by the first device. Wherein, capturing data field refers to locking data field, and then the data information carried in the data field is parsed.

Figure 6:
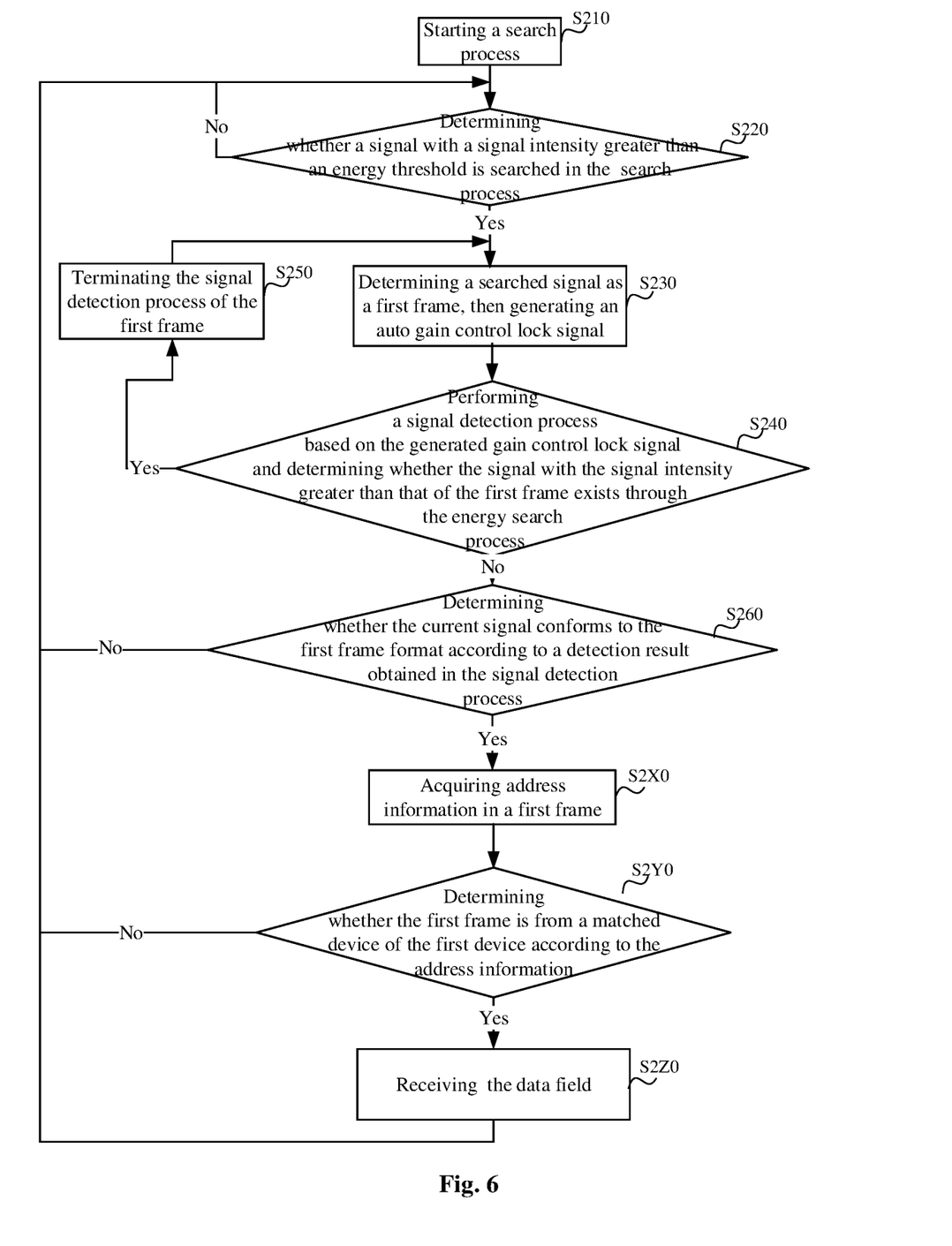
FIG. 6 is a flow chart of another method of communication according to an embodiment of the present disclosure.

If the step S2Y0 only be understood as determining whether the first frame is from the matched device of the first device according to the address information in the data field, the method of communication provided in this embodiment is as shown in FIG. 6, and further includes: if the first frame is from the matched device of the first device, performing step S2Z0 to receive the data field; otherwise, the first device gives up receiving the data field to start receiving other signals, so that the first device does not generate energy consumption due to the receiving of the first frame any more, reduction of invalid energy consumption is facilitated, and achieving an effect of saving energy consumption. It should be understood that an execution body of each step shown in FIG. 6 is the first device. In step S2Z0, the data field is received, that is, the data information carried by the data field is received.

In an optional embodiment, the method of communication further comprises: and if the first frame is from the matched device of the first device, the first device determines to stop the energy search, otherwise, the first device keeps the energy search.

It should be noted that the energy search is used to acquire a signal from a second device other than the first device. Specifically, before it is determined that the first frame is from the matched device of the first device, the energy search is performed, and if the signal with a signal intensity greater than that of the first frame is also searched in an execution process, the receiving process of the first frame is stopped and the receiving process of the signal with a greater signal intensity is started; the energy search remains performed after determining that the first frame is not from the matched device of the first device, at which time the receiving of the first frame is stopped, the energy search being for the signal with the signal intensity greater than an energy threshold.

In this embodiment, the first frame is from the matched device of the first device, and the first device determines to stop the energy search, which is to stop the search for other signals, so that the receiving process of the first frame transmitted by the matched device of the first device is not interrupted by other signals with large signal intensity. Also, stopping the energy search here is advantageous in reducing energy consumption compared to a prior art where the energy search is always performed.

Further, the first device receives the data field in a condition that the first frame is from the matched device of the first device, and the energy search is resumed when the receiving process of the data field is completed, so that other signals are searched for by the energy search.

Further, the method of communication further includes: searching the first frame through the energy search at a target time by the first device, and the first frame is a signal with the maximum signal intensity in at least one signal searched by the first device at the target time.

Further, the first frame further includes the signaling field, and the method of communication further includes: determining, by the first device, that the first frame conforms to a preset signal format according to the signaling field. Wherein the preset signal format is, for example, the Wi-Fi signal format, and it should be understood that this is only an example and is not meant to limit embodiments of the present disclosure. The preset signal format may be a format of a signal other than a Wi-Fi signal.

Specifically, a process of searching for the first frame refers to FIG. 6. In FIG. 6, operations of step S210 to step S260 control a start of step S2X0 and result in obtaining the first frame in step S2X0. The signal detection process performed in step S240 is a process in which the first device determines whether the first frame conforms to the set signal format according to the signaling field. Steps S210 to S260 are performed by the first device, and the execution process of these steps may refer to the execution process of steps S110 to S160, and the execution process of steps S210 to S260 will not be described here. Before the first frame is determined to be in accordance with the preset signal format, the Wi-Fi signal transmitted by the matched device may be detected as unobtrusively as possible in a field of wireless local area networks since the first frame in step S2X0 is determined by the energy search.

In an optional embodiment, in step S2Y0, operation of determining, by the first device, whether the first frame is from the matched device of the first device according to the address information in the data field includes: if the address information in the data field is matched with the address information stored locally in the first device, determining that the first frame is from the matched device of the first device, otherwise, determining that the first frame is not from the matched device of the first device.

Specifically, for the wireless local area network, the address information locally stored by the first device includes the MAC address of the first device and the MAC address of the matched device. In view of this, this embodiment may be implemented as any of the following alternatives:

(1) the first device extracts the effective destination address of the first frame from the address information, and judges whether an extracted destination address is the same as the MAC address of the first device. Wherein, it is determined that the first frame is from the matched device of the first device under a condition that the destination address is the same as the MAC address of the first device; and it is determined that the first frame is not from the matched device of the first device when the destination address and the MAC address of the first device are different. This embodiment only tracks the destination address in the address information, which is advantageous for saving power consumption by the first device. The address information in the data field is matched with the address information stored locally in the first device, and means that: the extracted destination address is the same as the MAC address of the first device.

(2) The first device extracts the effective source address of the first frame from the address information, and judges whether a extracted source address is the same as the MAC address of the matched device of the first device, wherein the matched device of the first device is a device which is connected to the first device through Wi-Fi at a current moment. Wherein determining that the first frame is from the matched device of the first device in a condition that the source address is the same as the MAC address of the matched device of the first device; and determining that the first frame is not from the matched device of the first device in a condition that the source address and the MAC address of the matched device of the first device are different. This embodiment only tracks the source address in the address information, which is also beneficial for the first device to save energy consumption. The address information in the data field is matched with the address information stored locally in the first device, which means that: the extracted source address is the same as the MAC address of the matched device of the first device.

It should be understood that some frames have invalid destination addresses, so that it is more appropriate to apply the second alternative described above; some frames have invalid source addresses so that it is more appropriate to apply the first alternative described above.

(3) The first device extracts the valid source address and the valid destination address of the first frame from the address information, determines whether the extracted source address is the same as the MAC address of the matched device of the first device, and determines whether the extracted destination address is the same as the MAC address of the first device. Wherein, it is determined that the first frame is from the matched device of the first device in a condition that the source address is the same as the MAC address of the matched device of the first device and the destination address is the same as the MAC address of the first device; it is determined that the first frame is not from the first device's matched device in a condition that the source address is different from the MAC address of the first device's matched device, and/or the destination address is the same as the MAC address of the first device. This embodiment tracks both source and destination addresses in the address information. The address information in the data field is matched with the address information stored locally in the first device, and means that: the extracted source address is the same as the MAC address of the matched device of the first device and the extracted destination address is the same as the MAC address of the first device.

It should be noted that, in the wireless local area network, the encrypted data information of the Wi-Fi signal sent by the matched device of the first device may be decrypted by the first device according to a predetermined manner, whereas the encrypted data information of the Wi-Fi signal sent by the unmatched device may not be decrypted by the first device in general. Thus, it does not make any sense that the first device receives Wi-Fi signals from the unmatched device. Under a limitation of contention mechanism, it is desirable that the first device ending the signal receiving process as soon as possible for the Wi-Fi signal from the unmatched device. In the prior art, Wi-Fi signals sent by the unmatched device are discarded after encrypted data information cannot be decrypted (that is, messy codes appear), so that the first device is in an invalid signal receiving process for a long time period.

In an alternative embodiment, step S2Z0 of receiving a data field, includes: generating a matching instruction by the first device to stop the energy search before the receiving process of the first frame is stopped based on the matching instruction. The matching instruction is used as a control instruction for data information analysis and also for controlling the energy search operation, and is a status signal. Referring to FIG. 6, that is, step S2Z0 is performed to suspend the energy search, then parse the data information carried in the data field, and resume the energy search after parsing the data information carried in the data field, at this time, step S220 is performed, and entering a receiving process of a next signal.

Further, the method of communication further includes: in a condition that the step S2Y0 determines that the first frame is not from the matched device of the first device, the first device generates a non-matching instruction so as to stop the receiving process of the first frame and maintain the energy search based on the non-matching instruction. It should be understood that in the condition that the first frame is not a matched device from the first device, step S2Z0 shown in FIG. 6 is not performed, so that the energy search is not suspended, and thus the energy search keeps running, and the non-matching instruction simply controls the receiving process of the first frame to stop, and step S220 is performed as shown in FIG. 6 to enter the receiving process of the next signal.

The matching instruction and the non-matching instruction may correspond to different level states of a same control instruction addrmatch. For example, the matching instruction indicates that the control instruction addrmatch is in a high-level state (i.e., addrmatch is 2), and the non-matching instruction indicates that the control instruction addrmatch is in a medium-level state (i.e., addrmatch is 1). In some examples, the control instruction addrmatch may also be in a low-level state (i.e., addrmatch is 0) to indicate that address information has not been obtained or whether the first frame is from the matched device of the first device has not been determined from the address information. After the configuration, the first device does not need to add a plurality of signals for representing whether the first frame comes from the matched device of the first device, which is beneficial to performing the method of communication with lower cost.

In order to make a location of the address information in the frame more clearly understood, the transmission duration of the frame may be considered. For a frame with a total transmission time of 1 ms, the address information in the frame is generally available in 0.05 ms. Thus, the address information is a predetermined number of bytes before the data field, and is also information earlier in the frame.

The method of communication provided by the embodiment of the disclosure includes:

(1) in the condition that the first frame is from the matched device of the first device, receiving the data field included in the first frame. In this condition, the first frame is not interrupted after the address information is parsed out, even if the signal with the larger signal intensity appears in the air interface environment. In addition, since the address information is a preset number of bytes before the data field, an allowable time length for the energy search to interrupt the receiving of the first frame is also short.

(2) In the condition that the first frame is not from a matched device of the first device, since the address information is a preset number of bytes before the data field, the first frame may be quickly identified, so that the first frame is discarded and then the receiving process of the next signal is performed, a wider idle time is provided for receiving the signal sent by the matched device, and a probability of missing detection of the signal sent by the matched device is reduced.

In view of above analysis, the method of communication provided in the embodiment of the present disclosure is that only the signal sent by the matched device is captured by the first device, and since the signal is captured and then the data information of the signal is parsed, the first device runs less processes for parsing the data information. In addition, since the energy search is suspended for a certain period of time when the first device searches for the signal from the matched device, a running time of the energy search is also reduced.

Figure 7:
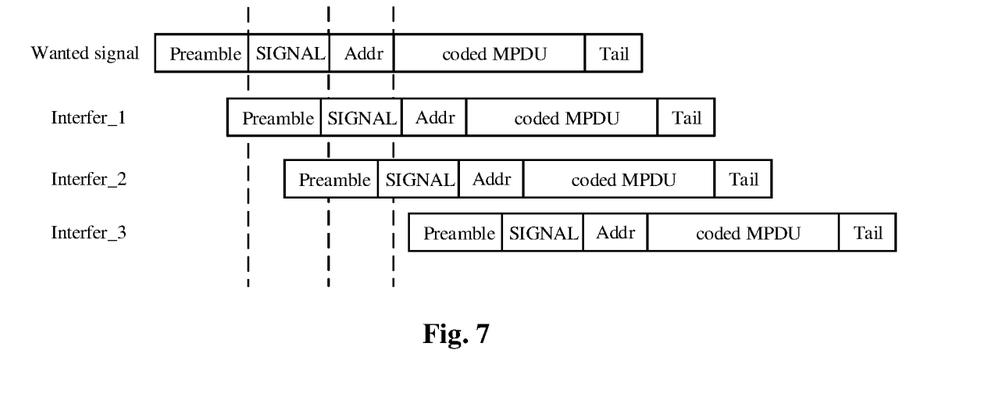
FIG. 7 is a schematic diagram of testing Wi-Fi signal receiving performance of a first device.

FIG. 7 is a schematic diagram of testing Wi-Fi signal receiving performance of a first device. Referring to FIG. 7, with the first device operated according to the method of communication provided by the present disclosure, after the Wi-Fi signal (wanted signal) sent by the matched device is received, in a condition that an interference signal Interfer_1 is searched before the preamble code (Preamble) of the Wi-Fi signal is completely parsed, the receiving process of the Wi-Fi signal is interrupted, and then: (1) when an interference signal Interfer_2 which is the same as the interference signal Interfer_1 is searched before the signal is completely parsed, the receiving process of the Wi-Fi signal (wanted signal) is also interrupted; (2) when the interference signal Interfer_3 which is the same as the interference signal Interfer_1 is searched after the address information Addr is completely parsed, the receiving process of the Wi-Fi signal (wanted signal) is not interrupted. The interference signal Interfer_1, the interference signal Interfer_2, and the interference signal Interfer_3 are not signals transmitted by the matched device of the first device, and may be understood as signals having the signal intensity greater than that of the Wi-Fi signal (wanted signal).

Figure 8:
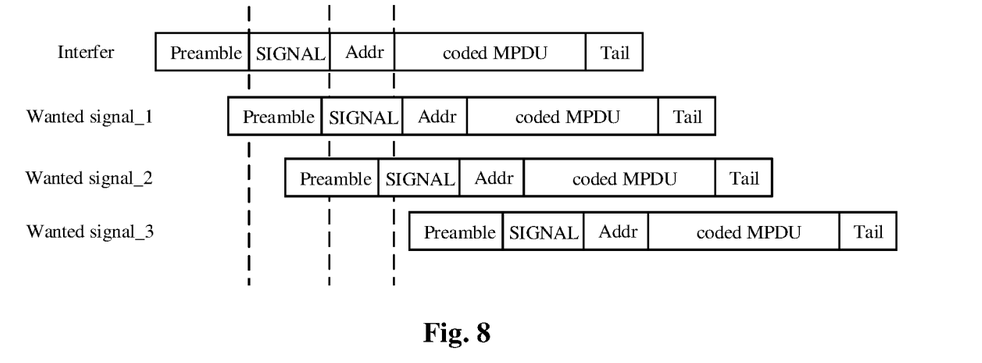
FIG. 8 is another schematic diagram of testing Wi-Fi signal receiving performance of a first device.

FIG. 8 is another schematic diagram of testing Wi-Fi signal receiving performance of a first device. Referring to FIG. 8, with the first device operated according to the method of communication provided by the present disclosure, after the interference signal (Interfer) is received, in a condition that the Wi-Fi signal (wanted signal_1) transmitted by the matched device is searched before the preamble code (Preamble) of the interference signal (Interfer) is completely parsed, the receiving process of the interference signal (Interfer) is not interrupted, and then: (1) when the Wi-Fi signal (wanted signal_2) which is the same as the Wi-Fi signal (wanted signal_1) is searched before the signaling SIGNAL is completely parsed, the receiving process of the interference signal (Interfer) is not interrupted; (2) the process of receiving the interference signal (Interfer) is automatically stopped when the address information Addr is completely parsed, and then entering the receiving process of the Wi-Fi signal (wanted signal_3) when the same Wi-Fi signal (wanted signal_3) as the Wi-Fi signal (wanted signal_1) is received (i.e., the Wi-Fi signal (wanted signal_3) is received), but it should be noted that: the receiving process of the interference signal (Interfer) is not interrupted by the Wi-Fi signal (wanted signal_3). The interference signal (Interfer) is not a signal transmitted by a matched device of the first device, and the Wi-Fi signal (wanted signal_1), the Wi-Fi signal (wanted signal_2) and the Wi-Fi signal (wanted signal_3) may be understood as signals having signal intensity smaller than that of the interference signal (Interfer) transmitted by a same matched device.

Test results of the signal receiving performance tests illustrated in FIGS. 7 and 8, respectively, also illustrate more in detail: according to the method of communication provided by the embodiment of the disclosure, Wi-Fi signals sent by the matched device are identified as soon as possible, so that the receiving process cannot be interrupted by interference; Wi-Fi signals transmitted by unmatched devices are identified and dropped as soon as possible, thus providing a wider idle time for the receiving process of Wi-Fi signals transmitted by matched devices. Thus, the method of communication provided by the disclosure enables the performance of the first device for receiving Wi-Fi signals to be effectively improved.

Figure 9:
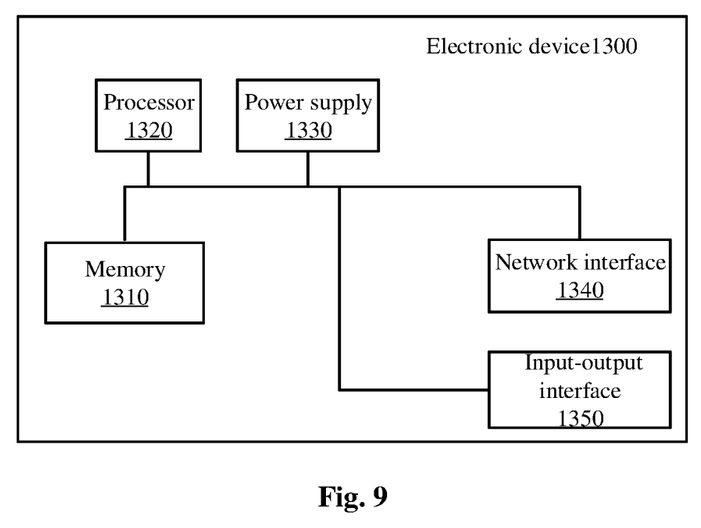
FIG. 9 is a schematic structural diagram of an electronic device according to an embodiment of the present disclosure.

The embodiment of the present disclosure further provides an electronic device 1300, as shown in FIG. 9, including a memory 1310, a processor 1320, and a program stored in the memory 1310 and capable of being executed on the processor 1320, wherein the program is capable of implementing each process of each embodiment in the method of communication when executed by the processor 1320, and is capable of achieving a same technical effect, and no further description is provided here to avoid repetition. The electronic device 1300 is, for example, a device for communication or a chip.

Of course, the electronic device may also include auxiliary sub-devices such as a power supply 1330, a network interface 1340, and an input-output interface 1350.

It will be understood by those skilled in the art that all or part of the steps of the methods of the above embodiments may be performed by instructions or by instructions controlling associated hardware, and the instructions may be stored in a computer readable storage medium and loaded and executed by a processor. To this end, the disclosed embodiments also provide a computer readable storage medium, on which a computer program or instructions are stored, which, when executed by a processor, can implement the processes of the embodiments of the method of communication described above. The computer readable storage medium may be a usb disk, a removable hard disk, a Read-Only Memory (ROM), a Random Access Memory (RAM), a magnetic disk, or an optical disk, which can store program codes.

Since the instructions stored in the readable storage medium can execute the steps in any method of communication provided by the embodiments of the present disclosure, the beneficial effects that can be achieved by any method of communication provided by the embodiments of the present disclosure can be achieved, for details, see the foregoing embodiments, and are not described herein again. The above operations can be implemented in the foregoing embodiments, and are not described in detail herein.

It should be noted that, in the description of the embodiments, the differences from the other embodiments are emphasized, and the same or similar parts between the embodiments can be understood by referring to each other. For system embodiments, because they are substantially similar to method embodiments, reference is made to the description of the method embodiments in this section for their relevance.

Further, it is noted that in the device and method of the present disclosure, it is apparent that each component or each step may be decomposed and/or recombined. These decompositions and/or recombination are to be considered equivalents of the present disclosure. Also, the steps of executing the series of processes described above may naturally be performed chronologically in the order described, but need not necessarily be performed chronologically, and some steps may be performed in parallel or independently of each other. It will be understood by those of ordinary skill in the art that all or any of the steps or components of the methods and device of the present disclosure may be implemented in any computing device (including processors, storage media, etc.) or network of computing devices, in hardware, firmware, software, or any combination thereof, which can be implemented by those of ordinary skill in the art using their basic programming skills after reading the description of the present disclosure.

Finally, it should be noted that: it should be understood that the above examples are only for clearly illustrating the present disclosure, and are not intended to limit the embodiments. Other variations and modifications will be apparent to persons skilled in the art in light of the above description. This need not be, nor should it be exhaustive of all embodiments. And obvious variations or modifications of the present disclosure as herein taught are within the scope of the present disclosure.

What is claimed is:

1. A method of communication, comprising:
   acquiring address information in a first frame by a first device, wherein the first frame comprises a data field, and the data field carries the address information, the address information is a preset number of bytes before the data field;
   determining whether the first frame is from a matched device of the first device according to the address information by the first device; and
   if the first frame is from the matched device of the first device, determining to stop energy search by the first device and to receive the data field by the first device, otherwise, abandoning to receive the data field by the first device.

2. The method according to claim 1, wherein the address information comprises a destination address and/or a source address.

3. The method according to claim 2, wherein the method further comprises:
   if the first frame is not from a matched device of the first device, keeping the energy search by the first device; wherein the energy search is used to acquire a signal from a second device other than the first device.

4. The method according to claim 1, wherein the method further comprises:
   if the first frame is not from a matched device of the first device, keeping the energy search by the first device; wherein the energy search is used to acquire a signal from a second device other than the first device.

5. The method according to claim 4, wherein the method further comprises:
   resuming, by the first device, the energy search when the data field is completely received.

6. The method according to claim 1, wherein determining, by the first device, whether the first frame is from a matched device of the first device according to the address information, comprises:
   if the address information in the data field matches address information stored in the first device, determining that the first frame is from the matched device of the first device, otherwise, determining that the first frame is not from the matched device of the first device.

7. The method according to claim 1, wherein the first frame further comprises a signaling field;
   the method further comprises: determining that the first frame meets a preset signal format according to the signaling field by the first device.

8. A device for communication, comprising: a processor and a memory, wherein the memory is configured to store a set of programs, instructions or codes, the processor is configured to execute the programs, instructions or the codes stored in the memory to operate steps of the method according to claim 1.

9. The device according to claim 8, wherein the address information comprises a destination address and/or a source address.

10. The device according to claim 8, wherein the processor is configured to execute the programs, instructions or the codes stored in the memory to operate steps of the method further comprising:
    if the first frame is from a matched device of the first device, determining to stop energy search by the first device, otherwise, keeping the energy search by the first device; wherein the energy search is used to acquire a signal from a second device other than the first device.

11. The device according to claim 10, wherein the processor is configured to execute the programs, instructions or the codes stored in the memory to operate steps of the method further comprising:
    receiving, by the first device, the data field while the energy search is stopped and resuming, by the first device, the energy search when the data field is completely received.

12. The device according to claim 8, wherein determining, by the first device, whether the first frame is from a matched device of the first device according to the address information, comprises:
    if the address information in the data field matches address information stored in the first device, determining that the first frame is from the matched device of the first device, otherwise, determining that the first frame is not from the matched device of the first device.

13. The device according to claim 8, wherein the first frame further comprises a signaling field;
    the method further comprises: determining that the first frame meets a preset signal format according to the signaling field by the first device.

14. The device according to claim 8, wherein the device is a chip.

15. A non-transitory computer readable storage medium, wherein the computer readable storage medium stores computer programs or instructions configured to be executed by a processor, implement the method of claim 1.

* * * * *